US008886262B2

(12) United States Patent
Samdanis et al.

(10) Patent No.: US 8,886,262 B2
(45) Date of Patent: Nov. 11, 2014

(54) METHOD FOR OPERATING A WIRELESS RADIO NETWORK AND A NETWORK (75) Inventors: Konstantinos Samdanis, Dossenheim (DE); Dirk Kutscher, Heidelberg (DE); Giorgio Nunzi, Heidelberg (DE); Marcus Brunner, Leimen (DE)

(73) Assignee: NEC Europe Ltd., Heidelberg (DE)

( * ) Notice: Subject to any disclaimer, the term of this patent is extended or adjusted under 35 U.S.C. 154(b) by 297 days.

(21) Appl. No.: 13/505,027

(22) PCT Filed: Oct. 27, 2010

(86) PCT No.: PCT/EP2010/006559
§ 371 (c)(1),
(2), (4) Date: Jun. 28, 2012

(87) PCT Pub. No.: WO2011/050952
PCT Pub. Date: May 5, 2011

(65) Prior Publication Data
US 2013/0130670 A1 May 23, 2013

(30) Foreign Application Priority Data

Oct. 28, 2009 (EP) .................................... 09013574

(51) Int. Cl.
*H04B 1/38* (2006.01)
*H04W 52/02* (2009.01)
*H04W 24/02* (2009.01)
*H04W 88/08* (2009.01)

(52) U.S. Cl.
CPC ...... *H04W 52/0203* (2013.01); *H04W 52/0258* (2013.01); *H04W 24/02* (2013.01); *H04W 52/0274* (2013.01); *H04W 88/08* (2013.01)
USPC ........... 455/574; 455/561; 455/423; 455/453; 370/311; 370/338

(58) Field of Classification Search
CPC ..... H04W 16/00; H04W 36/20; H04L 5/0048
USPC .......... 455/115.1–115.3, 69, 418, 422.1–425, 455/67.11–67.16, 450–453, 560, 561, 455/562.1, 572–574, 343.1–343.6; 370/318, 311, 338
See application file for complete search history.

(56) References Cited

U.S. PATENT DOCUMENTS 4,794,649 A * 12/1988 Fujiwara ............................ 455/9
5,682,417 A * 10/1997 Nitta .............................. 455/560
(Continued)

FOREIGN PATENT DOCUMENTS

GB          2 419 494       4/2006
WO        2009/031956      3/2009

OTHER PUBLICATIONS

International Search Report dated Feb. 22, 2011, corresponding PCT/EP2010/006559.

(Continued)

*Primary Examiner* — Sharad Rampuria
(74) *Attorney, Agent, or Firm* — Young & Thompson (57) ABSTRACT For allowing a particularly economic operation of a network with a high degree of energy conservation a method for operating a wireless radio network, especially a radio access network, is claimed, wherein the wireless radio network includes a core network, a number of base stations and at least one mobile host for wireless communication via at least one base station, wherein the method is characterized in that an association of powered on and powered off base stations within definable base station partitions will be arranged in a coordinated manner, thereby maintaining a minimum number or the smallest possible number of powered on base stations being necessary for accommodating a current traffic demand. Further, a network is claimed, preferably for carrying out the above mentioned method.

36 Claims, 4 Drawing Sheets (56) References Cited

U.S. PATENT DOCUMENTS

| | | | |
|---|---|---|---|
| 6,073,035 A * | 6/2000 | Witter .................... | 455/574 |
| 6,321,083 B1 | 11/2001 | Vaara et al. | |
| 6,473,617 B1 * | 10/2002 | Larsen et al. ............ | 455/446 |
| 6,584,330 B1 | 6/2003 | Ruuska | |
| 6,650,900 B1 * | 11/2003 | Chavez et al. ........... | 455/446 |
| 7,010,329 B2 * | 3/2006 | Livet et al. .............. | 455/574 |
| 7,027,843 B2 * | 4/2006 | Cromer et al. ........... | 455/574 |
| 7,904,115 B2 * | 3/2011 | Hageman et al. ........ | 455/561 |
| 8,005,479 B2 * | 8/2011 | Meiyappan ............... | 455/450 |
| 8,248,979 B2 * | 8/2012 | Kleindl .................... | 370/311 |
| 8,331,995 B2 * | 12/2012 | Hevizi et al. ............ | 455/574 |
| 8,489,154 B2 * | 7/2013 | Bishop et al. ............ | 455/574 |
| 8,494,595 B2 * | 7/2013 | Yoshiuchi et al. ....... | 455/574 |
| 8,509,859 B2 * | 8/2013 | Jarosinski et al. ....... | 455/574 |
| 8,515,492 B2 * | 8/2013 | Valerdi Rodriguez et al. ....................... | 455/561 |
| 8,554,224 B2 * | 10/2013 | Soliman et al. .......... | 455/436 |
| 8,660,547 B2 * | 2/2014 | Marin ...................... | 455/418 |
| 8,675,534 B2 * | 3/2014 | Hu et al. .................. | 370/311 |
| 2008/0304432 A1 * | 12/2008 | Lee et al. ................. | 370/311 |
| 2011/0045864 A1 * | 2/2011 | Chen et al. ............... | 455/522 |
| 2011/0269449 A1 * | 11/2011 | Kazmi et al. ............. | 455/422.1 |
| 2012/0252523 A1 * | 10/2012 | Ji et al. .................... | 455/522 |

OTHER PUBLICATIONS

Papadogiannis, et al.; "A Dynamic Clustering Approach in Wireless Networks with Multi-Cell Cooperative Processing"; May 19, 2008; pp. 4033-4037.

XP002621294; "3GPP TS 32.521 V1.1.0 Technical Specification 3rd Generation Partnership Project, Technical Specification Group Services and System Aspects; Telecommunications Management; Self-Optimization OAM; Concepts and Requirements (Release 9)"; Jul. 1, 2009; pp. 1-25.

Huawei, et al; "Discussion on Gradually Cell Switch off/on"; Oct. 12, 2009.

XP002621295; "3GPP TS 32.826 V0.3.0 Technical Report 3rd Generation Partnership Project, Technical Specification Group Services and System Aspects; Telecommunications Management; Study on Energy Savings Management (Release 9)"; Jul. 1, 2009; pp. 1-17.

XP050377799; 3rd Generation Partnership Project; Technical Specification Group Radio Access Network; Evolved Universal Terrestrial Radio Access Network (E-UTRAN); Self-Configuring and Self-Optimizing Network Use Cases and Solutions (Release 9); Sep. 1, 2009; pp. 1-22.

* cited by examiner

METHOD FOR OPERATING A WIRELESS RADIO NETWORK AND A NETWORK

BACKGROUND OF THE INVENTION

The present invention relates to a method for operating a wireless radio network, especially a radio access network, wherein the wireless radio network is comprising a core network, a number of base stations and at least one mobile host for wireless communication via at least one base station.

Further, the present invention relates to a network, especially a radio access network, preferably for carrying out the above method, wherein the wireless radio network is comprising a core network, a number of base stations and at least one mobile host for wireless communication via at least one base station.

Energy saving is a significant issue for the operation and service delivery of wireless networks, considering the increase of ICT (Information and Communications Technology) energy consumption and its impact in the environment. The network elements responsible for energy expenditure include the core network, the mobile host and the base station, which cause the highest energy consumption.

DESCRIPTION OF THE RELATED ART

Previous proposals concentrate on switching off elements and functions of base stations, see U.S. Pat. No. 6,584,330 B1, Adaptive Power Management for a Node of a Cellular Telecommunications Network, June 2003, or switching off base stations completely using local load information, see INFSO-ICT-216284 SOCRATES, D2.1, Use Cases for Self-Organizing Networks, March 2008, on an individual distributed manner. Such methodologies are uncoordinated; each base station performs energy management functions individually. Also, the known approaches are not flexible.

In cellular systems the main energy expenditure element is the base station considering the high coverage demand and the energy consumption per base station. Methods to improve its energy efficiency are significant in terms of cost and environmental issues especially considering the fact that the resource allocation of each base station is provisioned to handle peak hour traffic demands.

Since peak hours are only specific limited time periods, each base station is wasting energy at all remaining times. Optimal energy consumption is achieved when the capacity offered by the operator matches the traffic demands and this is accomplished by switching on and off cell functions and equipment or entire cells, see 3GPP TR 36.902, Evolved Universal Terrestrial Radio Access Network (E-UTRAN); Self-configuration and self-optimization network use cases and solutions (Release 9), May 2008 . Such energy saving management is based on measurements of traffic load in combination with long term statistics or threshold policies, which select the appropriate base stations and determine the time that they enter an energy saving mode, see U.S. Pat. No. 6,584,330 B1.

From M. A. Marsan, L. Chiaraviglio, D. Ciullo, M. Meo, "Optimal Energy Savings in Cellular Access Networks", IEEE ICC Workshop on Green Communications, June 2009, is obtainable a possibility of energy saving in cellular access networks where selected base stations are switched off to save energy. The known energy saving procedure assumes an identical traffic among neighbor cells and models the network using a regular layout.

A more generic approach is presented in INFSO-ICT-216284 SOCRATES, D2.1, Use Cases for Self-Organizing Networks, March 2008, where base stations determine whether to be switched on or off depending on traffic and load statics in combination with user equipment locations. Such approach is uncoordinated since each base station takes energy management decisions individually. Uncoordinated energy management proposals suit more not urban environments and Home eNodeB scenarios like the one presented in 3GPP R3-081174, Solution for interference reduction SON use case, May 2008.

In 3GPP R3-080082, Capacity and Coverage SON Use Case, February 2008, an energy saving proposal in relation with coverage and capacity is analyzed with emphasis on self-healing, where umbrella cells provide coverage of certain geographical areas. Certainly if such coverage is overlapping, assuming a two-tier architecture of the same radio access technology, it is not a realistic cellular network implementation. Similarly, M. A. Marsan, M. Meo, "Energy Efficient Management of two Cellular Access Networks", ACM SIGCOMM GreenMetrics Workshop, January 2009, demonstrates an energy efficient management scheme, which allows mobile hosts to roam between two different operator overlapping networks. The suggestion that different operators share their network facilities to save energy raises certain concerns about its feasibility from a business perspective due to the importance of coverage as a unique selling aptitude.

A dynamic relaying scheme presented in O. Teyb, V. van Phan, B. Raaf, S. Redana, "Dynamic Relaying in 3GPP LTE-Advanced Networks", Hindawi EURASIP Journal on Wireless Communications and Networking, Manuscript ID 731317, July 2009, associates relay enabled base stations with relay nodes depending on traffic load and geographic information in order to save energy and utilize the network capacity more efficiently. Such an approach may save power by permitting certain cells to reduce their transmission power and by switching off relay nodes or base stations depending on their traffic conditions. Dynamic relaying assumes the presence of relay nodes, which might not always be the case and requires a mechanism that associates relay nodes with relay enabled base stations, which increases the complexity of the network.

Further, from U.S. Pat. No. 6,321,083 B1 is known a traffic hot-spot locating method.

SUMMARY OF THE INVENTION

Thus, it is an object of the present invention to improve and further develop a method for operating a wireless radio network and an according network in such a way, that a particularly economic operation of the network with a high degree of energy conservation is possible.

In accordance with the invention, the aforementioned object is accomplished by a method according to claim 1. According to this claim the method is characterized in that an association of powered on and powered off base stations within definable base station partitions will be arranged in a coordinated manner, thereby maintaining a minimum number or the smallest possible number of powered on base stations being necessary for accommodating a current traffic demand.

Further, the aforementioned object is accomplished by a network according to claim 36. According to this claim, such a network is characterized by means for arranging an association of powered on and powered off base stations within definable base station partitions in a coordinated manner, thereby maintaining a minimum number or the smallest possible number of powered on base stations being necessary for accommodating a current traffic demand.

According to the invention it has been recognized that the arrangement of powered on and powered off base stations which are associated within definable base station partitions in a coordinated manner will make possible a particularly economic handling and operation of the network. Within the created base station partitions a minimum number or the smallest possible number of powered on base stations being necessary for accommodating a current traffic demand can be maintained. All remaining base stations within a partition not being necessary for accommodating a current traffic demand can be powered of. Such a method is particularly useful within an urban environment where the capacity and interference constraints limit the base station coverage at a significantly lower level than its potential maximum. Thus, the claimed method and network provide a particularly economic operation of the network with a high degree of energy conservation.

The present invention advances the current energy saving methods of cellular systems by arranging associations between powered on and powered off base stations creating base station partitions which can also be designated as energy subsets or energy partitions, where at least a single base station could be switched on providing coverage compensation on behalf of the remaining base stations which are switched off.

Preferably, the association could be based on at least one load parameter considering traffic load and/or radio and/or network resources and/or base station hardware load limitations. Accordingly a suitable distribution of load can be provided among the individual partitions.

Alternatively or additionally, the association could be based on geographical information related to the physical location of each base station.

Alternatively or additionally, the association could be based on mobility characteristics including speed, direction, sojourn times and/or historical mobility patterns of at least one host.

Further alternatively or additionally, the association could be based on significance of base stations within the network in terms of topology of physical links, such as radio bridges built on tree topologies.

In all cases the association could be arranged for reaching a very high or maximum possible energy conservation. Within a preferred embodiment, the aim of this invention is to balance the network load between energy partitions of a minimum number based on geographical location constraints keeping the inter-cluster mobility low and match the traffic demands with network capacity conserving the maximum amount of energy. Once such energy partitions are created the load conditions may change or the mobility among neighboring partitions may increase dramatically. Instead of waking up the appropriate base stations to handle the extra load or provide more smooth and efficient mobility i.e. re-establish the X2 interface for the case of LTE (Long Term Evolution), this invention examines whether a feasible re-arrangement exists to handle such load and mobility alternations by powering on a different base station and switching off the current one.

Preferably, a re-arrangement of the base station partitions could be performed depending on a variation or change of a load parameter and/or a mobility characteristic of a host.

The objective of re-arranging energy partitions is to conserve energy by matching better the resource demands with the capacity of the network. Such a re-arrangement of partitions could be performed by changing the association between the powered on and powered off base stations. The number of powered on and powered off base stations could be kept constant after such a change. However, at least one base station will be arranged within another partition after such a change of the association.

Within a very simple realization the re-arrangement could be performed by powering off at least one currently active base station. This situation could arise if other powered on base stations could additionally cover the traffic load and functionality of the powered off base station.

Further, the re-arrangement could be performed by powering on at least one selected inactive base station, preferably if another currently active base station could be powered off, so that a number of powered on base stations can be kept constant.

Within a preferred embodiment the powered on base station could provide a coverage compensation on behalf of at least one remaining base station which is switched off or which are switched off.

Within a further preferred embodiment a coverage of at least one powered on base station could be increased, so that another powered on base station could be powered off. In this case the powered on base station with increased coverage could compensate the functionality of the powered off base station.

For realizing a better performance or a changed or increased coverage of a powered on base station the antenna tilt and/or pilot channel power of at least one base station could be reconfigured, while at least one other base station could be powered off. Thus, the number of powered on base stations could be reduced for saving energy.

Within another preferred embodiment the re-arrangement could be performed by merging existing partitions. During such a merging process, currently powered on base stations could be powered off for reducing the number of powered on base stations. Such a merging of partitions could be performed if at least one partition is under-loaded, for example.

Preferably, the re-arrangement could comprise a shift of network load from one base station to a high or to the highest loaded base station. Thus, the lower loaded base station could be powered off, if it is no longer necessary for accommodating a current traffic demand. Further, such a re-arrangement could comprise a shift of only a part of network load, especially within a hot-spot area, from one base station to another base station. This could result in a re-arrangement wherein the number of powered on base stations is remaining constant and wherein only network load is distributed within a changed distribution.

The above re-arrangement or merging process might not be feasible when all the neighboring partitions are equally overloaded or because of geographic limitations. Thus, a selection procedure of a base station to power on could be performed, if no feasible re-arrangement is possible. In such a case, resolving overloading requires waking up one more base station in the coverage area of the overloaded partition.

The selection of such a base station could be based on geographical information, with the aim of identifying a base station that could handle with more flexibility the load associated with the existing energy partition or partition and powered on base station or base stations.

Preferably, a selection procedure of a base station to power on could comprise a calculation of relative distances among base stations within a partition. Such a calculation could be based on pre-assigned coordinates or GPS (Global Positioning System) information. Preferably after completion of such a calculation, a selection procedure of a base station to power on could comprise a determination of at least one powered off base station that can potentially provide coverage of the entire partition or a determination of at least one powered off base station that can provide a maximum coverage within the partition, if such a powered off base station is powered on.

Within a preferred embodiment a definable number of powered on base stations or each powered on base station monitors the traffic load and/or mobility within its partition. In case of a problem, the base station or base stations could collect and process the traffic load and/or mobility information from its neighbor partitions. If there is at least a neighbor partition not overloaded, the re-arrangement method could be applied. Otherwise another procedure tries to identify and/or select a base station to wake up inside the overloaded partition, preferably based on the load balancing flexibility with the already existing awake one.

Unlike the initial partition creation process, the load and mobility information is now based on energy partition measurements, which are enough to identify problems but insufficient for performing re-arrangements. Since the overloaded partition has no information about the distribution of the load inside its own area or the location of possible hot-spots, it is difficult to associate such extra load with the remaining sleeping base stations. To overcome such lack of information the following different approaches could be used.

As a first alternative the distribution of traffic load and/or mobility could be measured by waking up selected base stations shortly for only giving information or could be measured by external networks or sensor networks.

As a second alternative, the traffic load and/or mobility could be estimated based on time advance information and user equipment measurements form adjacent base stations.

As a third preferred alternative a re-arrangement of a partition could be guessed based on available traffic load and/or mobility information and its impact on load and/or mobility could be measured to readjust it further iteratively in case of a not satisfying solution.

During a re-arrangement procedure a functionality of a powered on base station of a partition could be moved towards a base station of a neighbor partition with a low or the lowest load and vice versa.

Within a further preferred embodiment an overloaded partition could be divided into a number of less loaded neighbors and a new partition could be created based only on geographical information.

Considering the architecture of a re-arrangement functionality different options are available assuming that load related measures are always performed by base stations.

Preferably a centralized management system could coordinate the re-arrangement. Such a centralized management system could provide the best possible re-arrangements and the best possible energy saving effect.

Within a concrete embodiment the management system could collect load measures from base stations periodically or on demand when an overloaded partition requests a re-arrangement process.

Because of the provision of load and/or mobility information by the base stations, the invention could provide a method wherein the base stations collectively make the decision for re-arrangement.

A second architecture option could be provided by a method, wherein overloaded base stations could exchange load information with neighbor base stations to perform the re-arrangement iteratively by continuing to exchange load information after each step.

The method wherein overloaded base stations exchange load information with neighbor base stations could be designated as distributed method. Especially within such a distributed method it is preferred to provide a coordination mechanism for avoiding synchronization problems within the re-arrangement.

Depending on the individual situation a powering off of a base station could be done incrementally on different levels. In other words, powering off of a base station is not necessarily a complete switch off of the base station.

Generally, the traffic demand or traffic load could be balanced between the partitions for ensuring a reliable and energy saving operation of the network. Preferably, the balancing could be performed on the basis of geographical location constraints, keeping low an inter-partition mobility of the host or hosts.

In order to avoid interference between the base stations the re-arrangement could be combined with a radio resource management among the base stations for avoiding or at least reducing interference effects.

Realizing the importance and the lack of an existing methodology, which identifies in a collectively coordinated manner the appropriate base stations to be switched off and on at off-peaks times, is the motivation for this invention. Such methodology aims to create the initial optimal energy saving arrangement and also to provide a means of conserving such energy savings by re-arranging associations between switched on and off base stations or alternatively determine the optimal base station to wake up if the re-arrangement process fails. Additional scenarios of interest include the deployment of radio coverage in campus, enterprise networks or large in-door deployments in general, where base stations are usually overlapping with each other to great extent.

This invention extends current energy conservation proposals by introducing subsets of switched on and off base stations, preferably based on load, mobility and geographical information. Within a preferred embodiment such subsets partition the network with the aim to power off the majority of base stations by increasing the coverage of the ones that are kept switched on. Preferably, the proposed invention identifies the location of the awake base stations, creates energy partitions and defines methods for performing re-arrangements in case of a load or mobility change to assure the maintenance of minimum energy consumption. In case of no feasible re-arrangement solution, our invention specifies a preferred method to indentify the base station to power on inside the problematic subset.

Important aspects of preferred embodiments of the invention are:
- Introduce the network partitions as a coordinated energy saving method that maintains associations among powered on and powered off base stations.
- Perform energy saving based on radio, network and hardware load, mobility, location significance of base stations and geographic information.
- Provide methods to conserve energy saving by performing energy partition re-arrangement when load or mobility conditions change.
- Define a method to select the base station in case of no feasible partition re-arrangement.

BRIEF DESCRIPTION OF THE DRAWING FIGURES

There are several ways how to design and further develop the teaching of the present invention in an advantageous way. To this end it is to be referred to the patent claims subordinate to patent claim 1 on the one hand and to the following explanation of preferred embodiments of the invention by way of example, illustrated by the figures on the other hand. In connection with the explanation of the preferred embodiments of the invention by the aid of the figures, generally preferred embodiments and further developments of the teaching will we explained. In the drawing

DETAILED DESCRIPTION OF THE INVENTION

Figure 1:
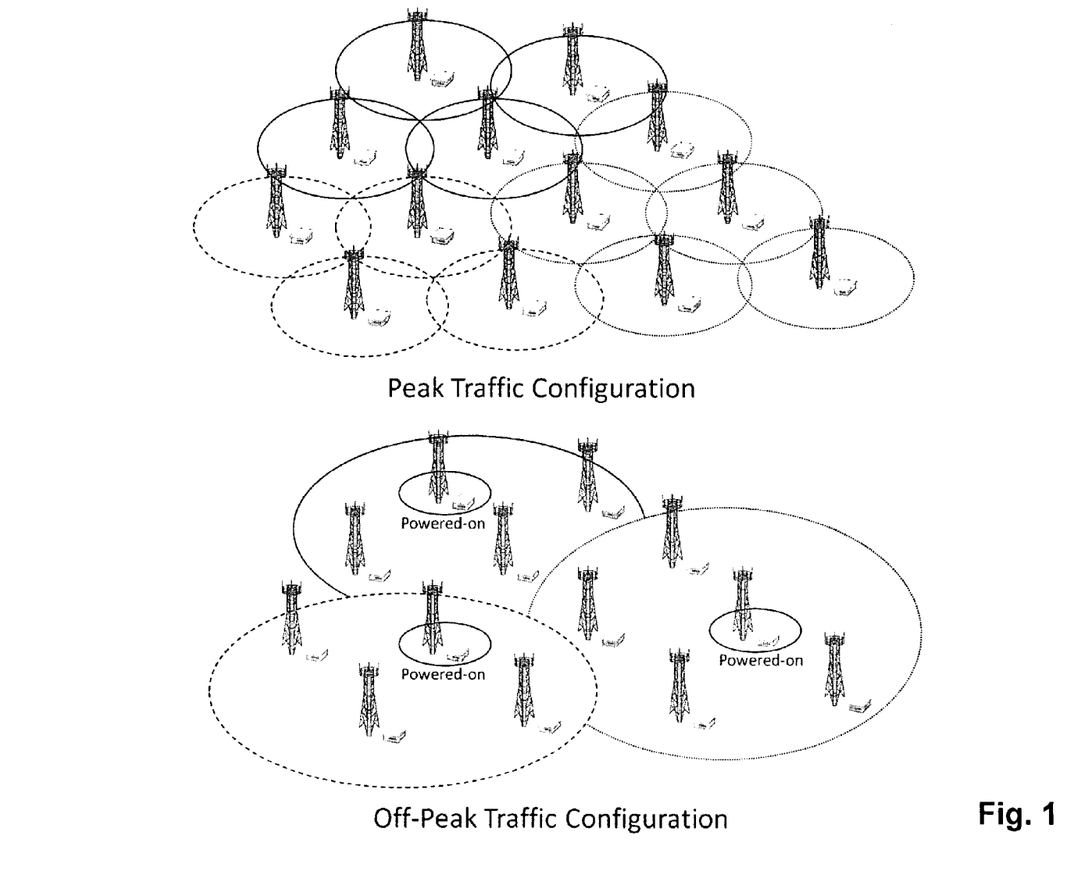
FIG. 1 is schematically illustrating the arrangement of associations of powered on and powered off base stations starting from a peak traffic configuration and resulting in an off-peak traffic configuration.

FIG. 1 is showing an embodiment wherein a peak traffic configuration with all base stations powered on has been changed into an off-peak traffic configuration with three partitions each having one powered on base station and further powered off base stations. Each powered on base station is covering regions of prior powered on base stations. Thus, the off-peak traffic configuration can safe energy compared with the prior peak traffic configuration. The remaining powered on base stations are reconfigured with regard to antenna tilt and pilot channel power.

After having created an initial optimal energy saving arrangement traffic and/or mobility could change, so that a re-arrangement is necessary for conserving energy saving effects.

Figure 2:
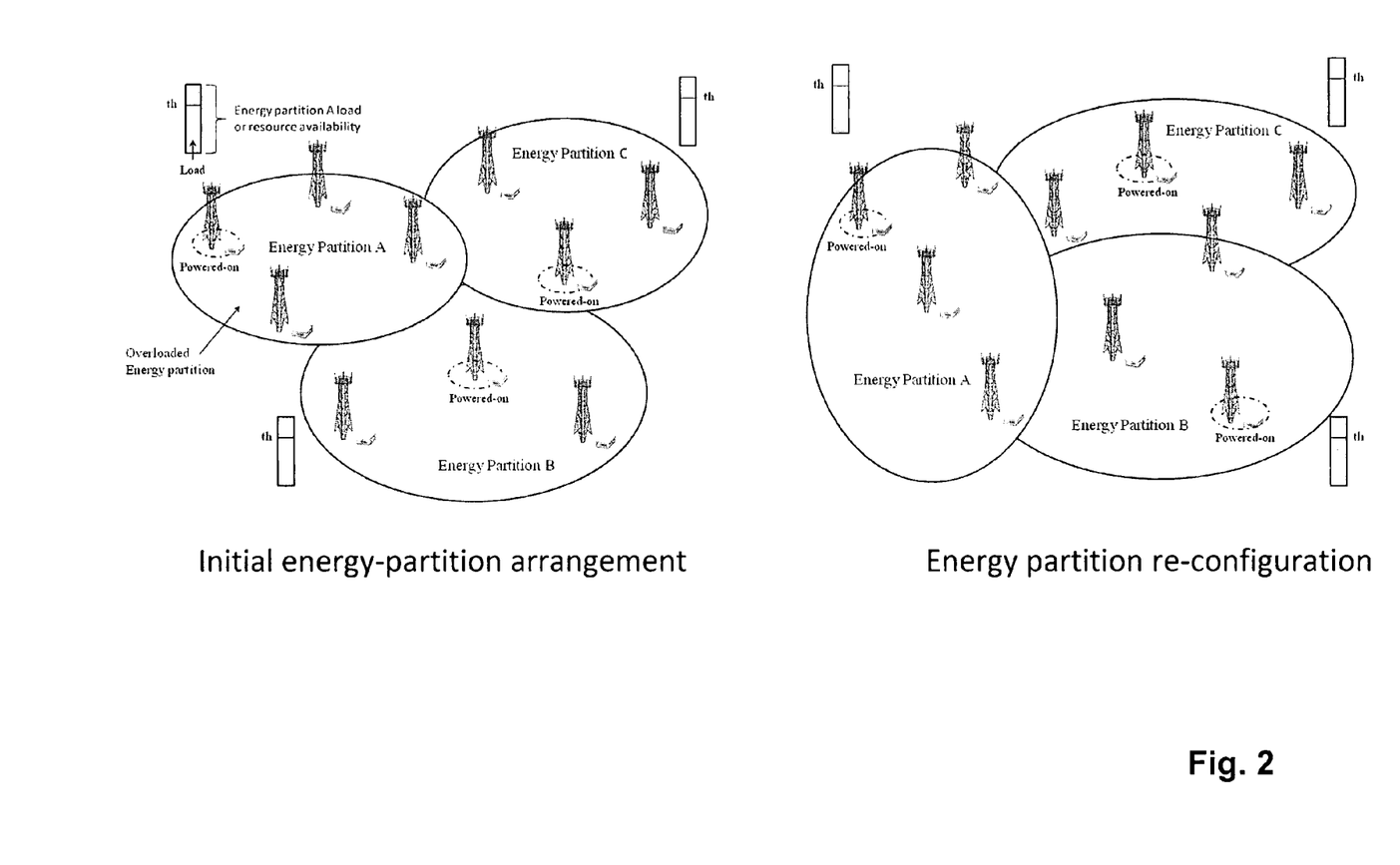
FIG. 2 is schematically illustrating an example of a re-arrangement process with the initial arrangement on the left side.

FIG. 2 is showing an example of a re-arrangement process with the initial arrangement on the left side, where the energy partition A experiences congestion due to load alternations and the re-arrangement balances the load and keeps a constant number of operating base stations, as shown on the right side. At each partition is shown an indicator of load with a threshold th. According to this indicator energy partition A on the left side is overloaded.

The re-arrangement or merging process might not be feasible when all the neighboring partitions are equally overloaded or because of geographic limitations. In this case, resolving overloading requires waking up one more base station in the coverage area of the overloaded partition. The selection of such base station should be based on geographical information, with the aim of identifying a base station that could handle with more flexibility the load associated with the existing energy partition (switched on base station). A preferred proposed algorithm for selecting base stations to power on inside the problematic partition is illustrated below.

Algorithm for Selecting Base Station to Power On
1. calculate relative distances among partition BS (Base Station)
2. if BS potentially covers the partition area
3. select the BS with max neighbor coverage or potential for arising load, preferably within the smallest distance
4. else
5. select the BS that provides the max coverage
6. end
7. power on selected BS
8. update interface and list$_{(n)}$
9. divide partition into two regions based on geographical info
10. handover UEs (User Equipment) to new BS associated with its geographic region
11. adjust border of new partitions iteratively until $P_{Load}$ and $P_{Rm}$ (Rm=Rate of Mobility) are optimized Initially the algorithm calculates the relative distances of the base stations inside the partition based on pre-assigned coordinates or GPS information. When such calculation is completed, the algorithm could determine the set of powered off base stations that can potentially provide coverage to the entire partition once they are powered on. If that set is empty the algorithm determines a set of base stations that provides maximum coverage. In either case, tie break is performed using the minimum distance from powered on base station as the constraint. Once the powered on base station is selected the essential updates take place including the update of interface and neighbors list$_{(n)}$ as well as of the necessary handovers. Consequently, the original partition is divided into two regions or partitions based on geographical information.

Figure 3:
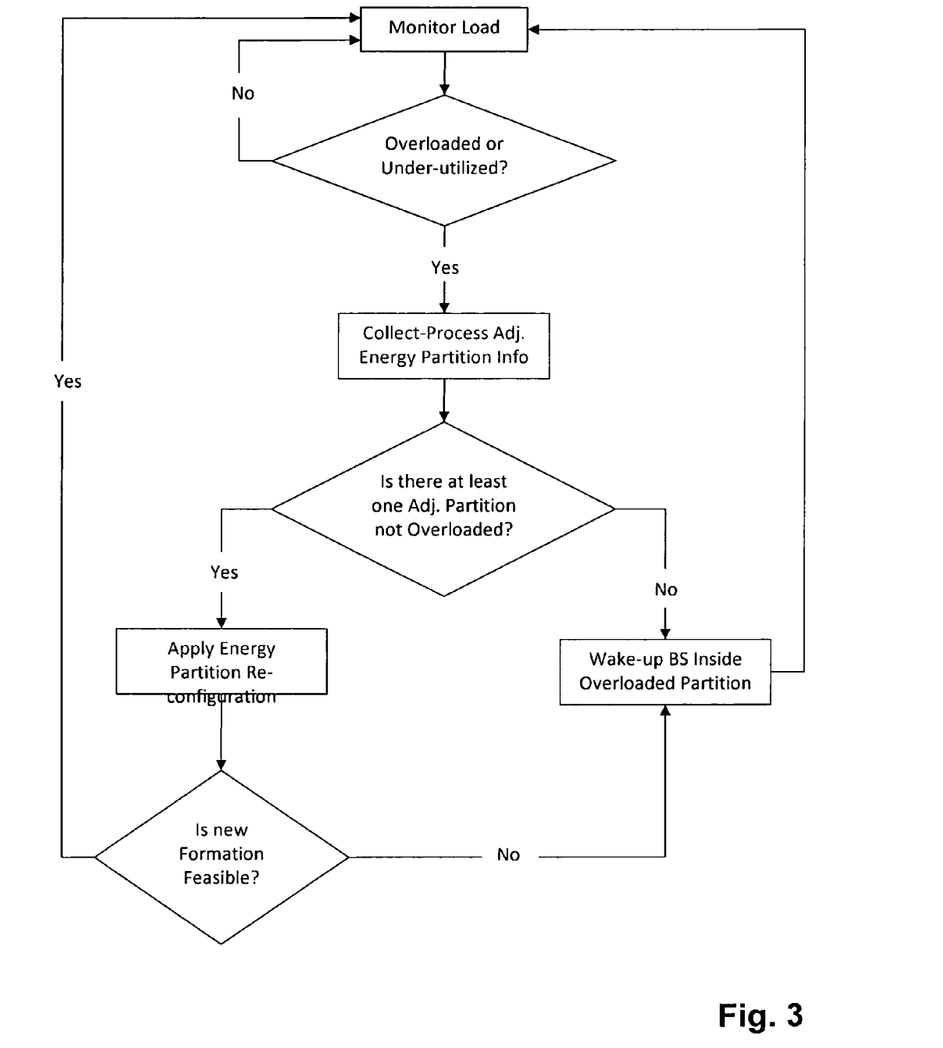
FIG. 3 is illustrating within a block diagram an overview of a preferred example of an energy saving method according to the invention and FIG. 4 is illustrating a further example of a re-arrangement where an energy partition is re-arranged and parts of the functionality of the active base station are moved into a different base station at another location.

An overview of a preferred example of the proposed energy saving method is illustrated in FIG. 3. Each awake or powered on base station monitors the load and mobility of its energy partition and in case of a problem it collects and processes the related information from its neighbor partitions. If there is at least a neighbor partition not overloaded, the re-arrangement method is applied; otherwise another algorithm tries to identify a base station to wake up inside the overloaded partition based on the load balancing flexibility with the existing awake one.

There could be added the case of merging partitions:
"If "underloaded", select a partition to merge with—including testing whether combined partition exceeds load threshold—and merge"

Unlike the initial partition creation process, the load and mobility information is now based on energy partition measurements, which are enough to identify problems but insufficient for performing re-arrangements. Since the overloaded partition has no information about the distribution of the load inside its own area or the location of possible hot-spots, it is difficult to associate such extra load with the remaining sleeping base stations. To overcome such lack of information the following different approaches are proposed:

Wake up selected base stations, preferably shortly for only giving information, or use external networks like sensor networks to measure the distribution of load and mobility information.

Estimate load and mobility based on time advance information and user equipment measurements from adjacent base stations as proposed in U.S. Pat. No. 6,321,083 B1.

Guess a re-arrangement of the problematic partition based on the available information and reactively measure its impact on load and mobility to readjust it further iteratively in case of a not satisfying solution.

Each approach produces a different degree of accuracy regarding load and mobility information, also related to the overhead of such exchange and the complexity of deployment. The more accurate the measure of load and mobility, the better is the quality of the re-arrangement solution. Iterative improvement graph partition algorithms, see G. Karypis, V. Kumar, "A Fast and High quality Multilevel Scheme for partitioning Irregular Graphs", SIAM Journal on Scientific Computing, Vol. 20, No. 1, August 1998, are good candidates for initially creating and re-arranging energy partitions based on accurate or estimated information and can handle effectively multiple constraints considering:

1. Base stations as graph nodes and the ability to handover between neighbor base stations as an incident link or link between two graph nodes.

2. Multiple load constraints as node weights, preferably at least three.
3. Mobility rates as the weight of links between two nodes.
4. Geographic information regarding the positioning of each base station.

In case of no detail information about the load or mobility, a guess is made with the following objectives:

Exchange associated sets of base stations (two or more base stations) and move iteratively the functionality of the powered on base station of the problematic energy partitions towards the neighboring partition with the lowest load and vice versa.

Divide the overloaded energy partition into the number of less loaded neighbors and create new random energy partitions based only on geographical info.

Figure 4:
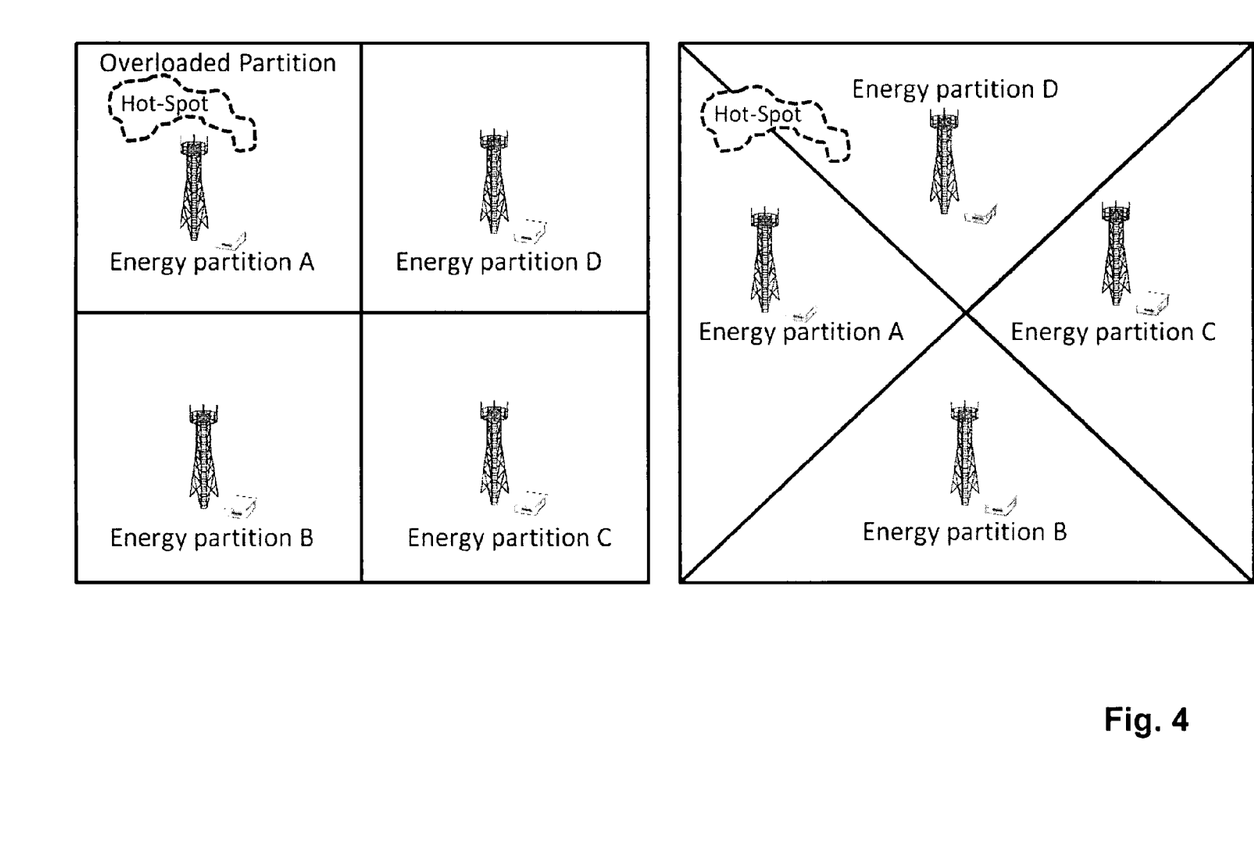

FIG. 4 demonstrates an example where an energy partition is re-arranged and the functionality of the active base station is moved into a different base station at another location. Specifically, the energy partition A is overloaded due to the current arrangement, which is affected by the presence of the indicated hot-spot. Re-arranging the partitions in a different way there is the opportunity to share the hot-spot load between neighboring partitions A and D, and consequently save energy by utilizing better the network resource consumption and avoiding switching on another base station.

Considering the architecture of the re-arrangement functionality the following options are available assuming that load related measures are always performed by base stations:

Centralized: OAM (Operations, Administration and Maintenance) system collects load measures from base stations periodic or on demand when an overloaded energy partition requests a re-arrangement process.

Distributed: The overloaded base stations exchange load information with neighbor base stations to perform the energy partitions re-arrangement iteratively by continuing to exchange load information after each step.

It is worth noting that in both re-arrangement approaches, iterations could be performed either serially or in parallel depending on the desired execution speed and overhead.

Furthermore, it should be noted that powering off a base station in the sense of the present invention can be done incrementally, with different levels of energy-savings. Powering off only the radio parts or the processors of base stations, is a desired option while reducing the cooling of the base station installation site or completely shutting off the power is the ultimate goal. The level of energy-reduction will typically depend on the duration in which the base station is expected to be powered off and the cost in terms of energy and time to change between power states. Certainly the reduction of the energy consumption also depends on the algorithm in use and on the accuracy of the information available for the re-arrangement process. Finally the proposed scheme considers sector cell arrangements and directed antennas.

Preferred centralized and distributed energy saving algorithms for creating initial partitions and/or re-arranging partitions based on accurate or estimated information are illustrated below. Considering the distributed version, a coordination mechanism, that avoids conflict among energy saving decisions of neighbour base stations, is essential to avoid synchronization problems. Based on this mechanism each base station BS, with load below a specified threshold and neighboring list within coverage range finds the minimum load neighbor base station with the maximum mobility rate $R_{(m)}$ breaking ties based on geographic information. Provided that the summarized load of the two base stations is below the threshold $L_{th}$ the algorithm proceeds to determine the base station to be powered on and off respectively. Otherwise the process terminates for that particular base station and continues on another one. In determining the base station to be powered on $BS_{(pon)}$, the algorithm selects the one, which provides the potential to cover the maximum number of neighbor base stations including the following cases:

$BS_{(pon)}$=max list$_{(n)}$ within min distance, $BS_{(pon)}$=max list$_{(n)}$ with min sum Load, where list$_{(n)}$ is the neighbor list. Once the powered on base station is identified the update process takes place including interfaces and neighbor list as well as the new Load and mobility rates update of the powered on base station before the handover of the mobile hosts or user equipment (UE) to the powered on base station. The powered on base station is further considered in the process which is carried on until there is no more room for improvement either due to load-mobility or geographical constraints.

Distributed Energy Saving Algorithm Based on Load
1. while Load<$L_{th}$ and $BS_{(geo\ loc)}$<$Dist_{th}$
2. find min Load neighbor with max $R_{(m)}$ or $R_{(m)}$>$m_{th}$
3. break ties based on geographic info
4. if sum Load<$L_{th}$
5. $BS_{(pon)}$=BS with potential to cover max number of neighbor BS
6. handover UE to powered on BS
7. update interface and list$_{(n)}$
8. update Load to list(n)
9. end
10. end Centralized Energy Saving Algorithm Based on Max Neighbor List
1. select BS with max list$_{(n)}$ neighbor break ties based on Load
2. while Load<$L_{th}$ and $BS_{(geo\ loc)}$<$Dist_{th}$
3. find min Load neighbor with max $R_{(m)}$ or $R_{(m)}$>$m_{th}$
4. break ties based on geographic info
5. if sum Load<$L_{th}$
6. keep track of powered off BS and association with powered on BS
7. else
8. break
9. end
10. Load=sum Load
11. end
12. handover UE to powered on BS
13. update interface and list$_{(n)}$
14. update Load to list$_{(n)}$ In terms of the centralized version, the proposed algorithm selects the base station with the maximum neighbor list indicated as list$_{(n)}$, breaking ties based on load constraints. Once such base station is selected the algorithm checks the load and distance from its neighbor base stations. Provided that the selected base station is not overloaded and its neighbor list contains base stations within its coverage range, it identifies the neighbor base station with the minimum load and/or mobility rate beyond the specified threshold. Tie break is again performed based on geographical information. If the load sum of the selected base stations is below the specified threshold the algorithm updates the appropriate load parameters and continues until the load sum surpasses such threshold or until there is no more improvement due to mobility rates and/or geographical limitations. When the process is completed the algorithm instructs the appropriate base station to execute the essential updates and UE handover.

It is worth noting that the centralized version could also run the previous described distributed algorithm requiring minor changes within the selection of the minimum load base station process. In particular, a centralized algorithm would select the minimum load base station instead of using time offsets and progress in a similar manner.

The re-arrangement process is triggered when the partition load $P_{Load}$ is greater than the load threshold $L_{th}$ or when the mobility rate $P_{Rm}$ among adjacent partitions is greater than the predefined mobility rate value $m_{th}$. In either case, the problematic partition finds the minimum load or maximum mobility rate neighbor partition. It selects then a base station either from its neighbor list or using GPS information closer to the target neighbor partition. It then checks whether the new position of the powered on base station covers geographically the complete partition. In case, the position of the new powered on base station is not covering the entire partition the algorithm requests the neighbor base stations towards the coverage hole to extend their power/tilt range. In case of a failure the closest partition performs a re-arrangement process by powering on a base station closer the coverage hole.

Once the coverage hole issues are resolved the selected base station is powered on, followed by the essential interface and neighboring list updates before the handover of the UE takes place. The new powered on base station monitors the new load and mobility rates associated with the new position and partition arrangement. A satisfactory new arrangement causes the algorithm to terminate otherwise it continues until a solution is identified or there is no more room for improvement.

Energy Saving Iterative Re-Arrangement Algorithm
1. while $P_{Load} > L_{th}$ or $P_{Rm} > m_{th}$
2. find neighbor min $P_{Load}$ or max $P_{Rm}$
3. select neighboring BS with min Dist towards target partition
4. if new $BS_{(pon)}$ cannot cover partition area
5. request neighbor partition to extend coverage
6. if extended coverage creates holes
7. request the closer distance neighboring partition BS to perform re-arrangement
8. end
9. end
10. power on selected BS
11. handover UEs
12. update interface and list$_{(n)}$
13. monitor new load and mobility info
14. end The alternative second re-arrangement algorithm, divides the problematic partition into at least two sub-partitions and then based on these tries to re-assemble partitions could also adopt the iterative approach for such re-assemble process.

Important aspects of preferred embodiments of the invention are:

1. Method to arrange a set of mobile network base stations into partitions and selecting at least one base station from each partition in order to optimize energy saving for the access network while maintaining coverage and performance objectives of the operator by switching on and off base stations or components based on load parameters, mobility and/or geographical information.

2. Method to re-arrange the partitions in case of a change of load and mobility, depending on the available load, mobility information and/or geographic information.

3. Three different re-arrangement approaches depending on the type-accuracy of load, mobility and/or geographic information including accurate, estimate, no information.

4. Method to perform energy saving management in cellular systems in a distributed way.

5. Method to awake a base station in case of no feasible re-arrangement of a subset.

6. Method to merge partitions or power off base stations in case of redundant resources.

7. Introduction of energy partitions as a mean to match the traffic demands with network capacity and consequently provision of the maximum energy saving by determining the base stations, which are switched on and off.

8. This invention is the only one that encounters radio network and hardware load, mobility, network location significance of certain base stations and geographic information in the process of providing more efficient energy management in cellular systems.

9. Provision of methods to conserve energy saving when the load and mobility conditions change by re-arranging energy partitions and utilizing the capacity of the network in a more efficient manner.

10. Definition of a method to select the base station that is the most flexible in providing load balancing on an overloaded energy partition in case of no feasible re-arrangement solution.

Compared to current state of the art this invention provides a method to increase the energy savings in wireless urban cellular networks and consequently produce higher operation cost savings for network operators, while being more environmental friendly.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for operating a wireless radio network, wherein the wireless radio network is comprising a core network, a number of base stations and at least one mobile host for wireless communication via at least one base station, comprising the steps of:

where a peak traffic configuration is defined as where all the base stations of the wireless radio network are powered on, during an off-peak traffic configuration, defining base station partitions where a base station partition is an association of powered on and powered off base stations where each powered on base station can cover regions of prior powered on base stations;

within the created base station partitions, maintaining a minimum number or smallest possible number of powered on base stations being necessary for accommodating a current traffic demand, with all remaining base stations within each partition not being necessary for accommodating the current traffic demand being powered off; and once the base station partitions are created, when load conditions or mobility among neighbouring partitions change, performing a re-arrangement of the base station partitions by changing the association between the powered on and the powered off base stations, wherein a functionality of one powered on base station of a first partition is moved towards another base station of a neighbouring second partition with a lower load.

2. A method according to claim 1, wherein, when the load conditions or mobility among neighbouring partitions change, the step of performing the re-arrangement of the base station partitions includes both:

i) the functionality of the one powered on base station of the first partition being moved towards the other base station of the neighbouring second partition, and ii) a functionality of one powered on base station of the second partition being moved towards the base station of the first partition.

3. A method according to claim 1, wherein the association is based on geographical information related to the physical location of each base station.

4. A method according to claim 1, wherein the association is based on mobility characteristics including speed, direction, sojourn times and/or historical mobility patterns of at least one host.

5. A method according to claim 1, wherein the association is based on significance of base stations within the network in terms of topology of physical links.

6. A method according to claim 1, wherein, depending on a variation or change of a load parameter and/or a mobility characteristic of a host, a re-arrangement of the base station partitions will be performed.

7. A method according to claim 6, wherein the association between the powered on and powered off base stations will be changed.

8. A method according to claim 6, wherein the re-arrangement will be performed by powering off at least one currently active base station.

9. A method according to claim 6, wherein the re-arrangement will be performed by powering on at least one selected inactive base station.

10. A method according to claim 9, wherein the powered on base station is providing a coverage compensation on behalf of at least one remaining base station which is or are switched off.

11. A method according to claim 6, wherein a coverage of at least one powered on base station will be increased.

12. A method according to claim 6, wherein the antenna tilt and/or pilot channel power of at least one base station will be reconfigured, while at least one other base station will be powered off.

13. A method according to claim 6, wherein the re-arrangement will be performed by merging existing partitions.

14. A method according to claim 13, wherein merging of partitions will be performed if at least one partition is underloaded.

15. A method according to claim 6, wherein the re-arrangement is comprising a shift of network load from one base station to a high or to the highest loaded base station.

16. A method according to claim 6, wherein the re-arrangement is comprising a shift of a part of network load within a hot-spot area from one base station to another base station such that a hot-spot originally located exclusively with the first partition, upon re-arrangement, is located within both the first partition and the neighbouring second partition.

17. A method according to claim 6, wherein a selection procedure of a base station to power on will be performed, when no feasible re-arrangement is possible.

18. A method according to claim 6, wherein a selection procedure of a base station to power on is comprising a calculation of relative distances among base stations within a partition.

19. A method according to claim 6, wherein a selection procedure of a base station to power on is comprising a determination of at least one powered off base station that can potentially provide coverage of the entire partition or a determination of at least one powered off base station that can provide a maximum coverage within the partition.

20. A method according to claim 1, wherein a definable number of powered on base stations or each powered on base station monitors the traffic load and/or mobility within its partition.

21. A method according to claim 20, wherein the base station or base stations collect and process the traffic load and/or mobility information from its neighbour partitions.

22. A method according to claim 1, wherein the distribution of traffic load and/or mobility will be measured by waking up selected base stations shortly for only giving information or will be measured by external networks or sensor networks.

23. A method according to claim 1, wherein the traffic load and/or mobility will be estimated based on time advance information and user equipment measurements from adjacent base stations.

24. A method according to claim 1, wherein a re-arrangement of a partition will be guessed based on available traffic load and/or mobility information and its impact on load and/or mobility will be measured to readjust it further iteratively in case of a not satisfying solution.

25. A method according to claim 1, wherein an overloaded partition will be divided into a number of less loaded neighbors and a new random partition will be created based only on geographical information.

26. A method according to claim 6, wherein a centralized management system is coordinating the re-arrangement.

27. A method according to claim 26, wherein the management system collects load measures from base stations periodically or on demand when an overloaded partition requests a re-arrangement process.

28. A method according to claim 6, wherein the base stations collectively make the decision for re-arrangement.

29. A method according to claim 6, wherein overloaded base stations exchange load information with neighbour base stations to perform the re-arrangement iteratively by continuing to exchange load information after each step.

30. A method according to claim 6, wherein a coordination mechanism for avoiding synchronization problems within the re-arrangement will be provided.

31. A method according to claim 1, wherein powering off of a base station will be done incrementally on different levels.

32. A method according to claim 1, wherein the traffic demand or traffic load will be balanced between the partitions.

33. A method according to claim 32, wherein the balancing will be performed on the basis of geographical location constraints, keeping low an inter-partition mobility of the host or hosts.

34. A method according to claim 6, wherein the re-arrangement will be combined with a radio resource management among the base stations for avoiding interference effects.

35. A method according to claim 1, wherein the association is based on at least one load parameter considering traffic load and/or radio and/or network resources and/or base station hardware load limitations.

36. A network, comprising:
a core network,
a number of base stations,
at least one mobile host for wireless communication via at least one base station, and
an arranging means for arranging an association of powered on and powered off base stations,
wherein with respect to a peak traffic configuration where all the base stations of the wireless radio network are powered on, said arranging means, during an off-peak traffic configuration, defines base station partitions where a base station partition is an association of powered on and powered off base stations where each powered on base station covers regions of prior powered on base stations, wherein said arranging means maintains within the created base station partitions a minimum number or the smallest possible number of powered on base stations being necessary for accommodating a current traffic demand, and wherein said arranging means power offs all remaining base stations within a partition not being necessary for accommodating a current traffic demand, when these base station partitions are created by said arranging means, when the load conditions or the mobility among neighbouring partitions change, a rearrangement of the base station partitions is performed by changing the association between the powered on and powered off base stations by said arranging means, wherein, by said arranging means, i) a functionality of one powered on base station of a first partition is moved towards another base station of a neighbouring second partition with a lower and ii) a functionality of one powered on base station of the second partition is moved towards another base station of the first partition.

* * * * *